Apr. 24, 1923.
O. K. OLSON
1,453,172
TRAP NEST FOR HENS
Filed Jan. 4, 1922
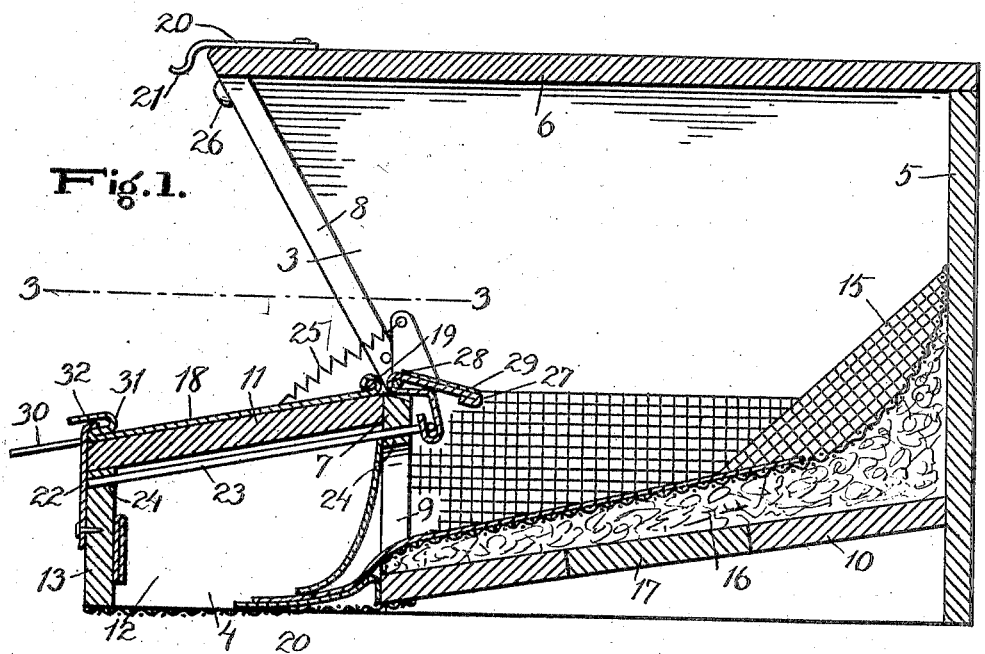
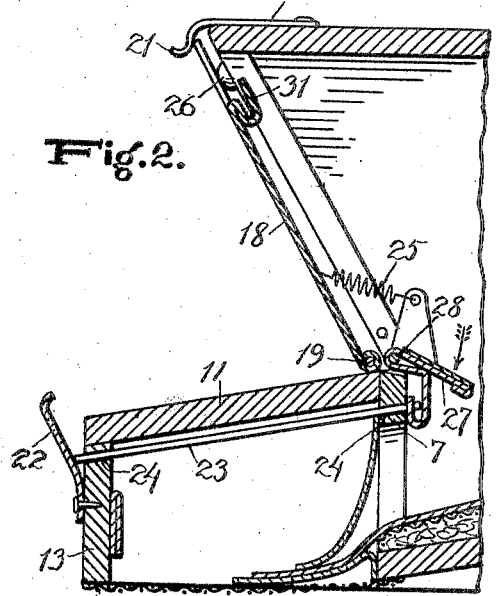
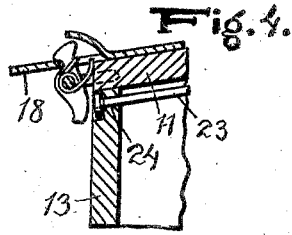
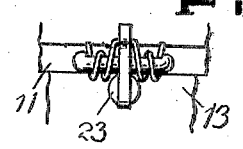
Ole K. Olson.
Inventor
by
E. W. Anderson Jr.
Attorneys Patented Apr. 24, 1923.

1,453,172

UNITED STATES PATENT OFFICE.

OLE K. OLSON, OF OAKDALE, NORTH DAKOTA.

TRAP NEST FOR HENS.

Application filed January 4, 1922. Serial No. 526,941.

*To all whom it may concern:*

Be it known that I, OLE K. OLSON, a citizen of the United States, resident of Oakdale, in the county of Dunn and State of North Dakota, have made a certain new and useful Invention in Trap Nests for Hens; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a central vertical transverse section of the invention, showing the door in open position.

Figure 2 is a similar view of a portion of the invention with the door closed.

Figure 3 is a detail plan view of the door and parts adjacent to its hinge.

Figure 4 is a detail side view of a modified form of catch device.

Figure 5 is a detail front view of the same.

The invention has relation to hens' nests, having for its object to provide an improved trap nest, the advantages of which will hereinafter appear.

The invention consists in the novel construction and combinations of parts as hereinafter set forth.

In the accompanying drawings illustrating the invention, the numeral 2 designates the nest, which may be made up in the form of a battery or plurality of nests as shown in my Patent Number 1,402,790, issued January 10, 1922, said nest having a frame or casing provided with end walls 3, 3, having each a forward extension 4; a back wall 5; a top wall 6; a front wall 7 having an upper series of entrance openings 8 for the hens and a lower series of exit openings 9 for the eggs; an inclined bottom wall 10 located above or spaced apart from the lower edges of said end walls and of said rear wall; a hinged top or cover 11 for the forward extension chamber 12 for eggs formed by the forward extensions of said end walls and a front wall 13 for said extension chamber.

Each nest is provided with a wire cloth bottom 15 extending upon an incline upwardly from the front portion of the nest to the rear portion thereof to leave a space or chamber 16 between the same and the bottom board 10 of the casing, and within which is placed excelsior or straw which extends somewhat through the openings of the wire cloth bottom and is visible to the hens therethrough a door 17 being provided in the bottom 10, and accessible from beneath the casing.

Each entrance opening 8 is provided with a door 18 hinged at 19 in the angle at the rear of the cover 11 and of such breadth that when raised to close said entrance opening, a spring catch 20 may be automatically engaged with the free edge thereof to hold the door in closed position until released by an attendant, said catch being secured to the top wall 6 of the casing, and having a cam free end 21.

When the door 18 is in open position it is located over and approximately parallel with the cover 11, on which it rests, being however of breadth sufficient to project somewhat beyond the free end of said cover.

The front wall of the extension chamber 12 is provided with a spring catch 22, which has engagement with the door 18 when in open position to hold the door in said position, until released automatically by the hen in entering the nest in the manner to be explained.

A reciprocatory rod 23 has sliding engagement with perforations 24 of the walls 13 and 7, near the upper portion of the chamber 12 out of the way, said rod having at its forward end engagement with the catch 22 to push the same outwardly and release the door 18, which is thereupon drawn upwardly to closed position by its spring 25, suitable cushions 26 being provided at the upper end of the wall 7 to prevent the door from closing tightly against said wall to thereby guard against catching the feathers of the hen between said door and said wall. The rod 23 is operated as stated by the hen in entering the nest, a trip lever 27 being fulcrumed or hinged at 28 and projecting partly within the nest chamber just in rear of the door 18 and upon which the hen is obliged to tread in passing through the opening 8, one arm 29 of said lever forming in effect an extension of the platform of the door 18 upon which the hen walks in entering the nest and being extended in area or surface to invite the hen to step thereon, the other arm of said lever having engagement with the rear end of the rod 23.

In order to guard the catch 22 from being stepped on by the hen, the door 18 is notched or slotted at 30 and the tongue 31 of the material of said door is first bent reversely to provide a convenient means of engagement with the catch 22 and then bent forwardly at 32 to provide a guard overhanging said catch. The door 18 or other portions of the casing may be provided with suitable openings to admit air for ventilation of the nest. The egg collection chamber 12 may be provided with partitions separating the chambers relating to different nests where a battery of nests is used.

It is preferred to have the front wall 7 of the nest slant forwardly from below upwards in order to increase the capacity of the nest.

This invention may be used as an attachment for the nest of my aforesaid patent, as well as built into the nests when made, and is designed to prevent escape of the hen until released by an attendant, and to avoid frightening the hen, as the door cannot become unfastened prior to the hen's entry into the nest. The trip lever is located in the space between the openings 8 and 9 and does not project downwardly sufficiently to interfere with the opening 9. This lever may be covered with suitable material.

In the modified form of the catch 22 shown in Figures 4 and 5, said catch is pivoted to the top of the collection chamber for eggs, whereby both the trap door and the said top may be raised together or as a whole when it is desired to inspect the egg collection chamber, rendering it unnecessary to first release all of the trap doors of a battery of nests prior to inspection of said chamber.

I claim:—

1. In a hen's nest, a casing the front wall of which is provided with an upper entrance opening for the hen, and a lower exit opening for the eggs, a forward collection chamber for eggs communicating in rear with said exit opening and having a removable top, a trap door normally resting upon said top and hinged in the angle between said top and said front wall, and adapted when raised to close said entrance opening, a spring for raising said door, means for holding said door in lowered normal position, and means for releasing the holding means including a lever fulcrumed adjacent to the angle of said front wall and said top, and a reciprocatory rod engaged by one arm of said lever and at its outer end engaging the holding means.

2. In a hen's nest, a casing the front wall of which is provided with an upper entrance opening for the hen and a lower exit opening for the eggs, a forward collection chamber for eggs communicating in rear with said exit opening and having a removable top, a trap door normally resting upon said top and hinged at the angular junction of said front wall and said top and adapted when raised to close said entrance opening, a catch pivoted to the front wall of said collection chamber and engaging said door to hold it in lowered position, a lever fulcrumed adjacent to the angular juncture of said front wall and said top, and having an arm located just within said entrance opening and adapted to be trod upon by the hen, and a reciprocatory rod engaging by the other arm of said lever and adapted at its forward end to engage said catch to release said door.

In testimony whereof I affix my signature in presence of two witnesses.

OLE K. OLSON.

Witnesses:
T. H. H. THORESEN,
CLARA M. LARSON.